United States Patent
Hua et al.

(10) Patent No.: US 6,879,497 B2
(45) Date of Patent: Apr. 12, 2005

(54) MULTIPLE OUTPUT POWER ADAPTER

(75) Inventors: Guichao Hua, Edison, NJ (US); Ning Zhai, Hangzhou (CN)

(73) Assignee: Bel Fuse, Inc., Jersey City, NJ (US)

( * ) Notice: Subject to any disclaimer, the term of this patent is extended or adjusted under 35 U.S.C. 154(b) by 67 days.

(21) Appl. No.: 09/932,385

(22) Filed: Aug. 17, 2001

(65) Prior Publication Data

US 2002/0043942 A1 Apr. 18, 2002

(30) Foreign Application Priority Data

Aug. 17, 2000 (CN) .......................................... 00246488 U

(51) Int. Cl.$^7$ .......................................... H02M 3/335
(52) U.S. Cl. ...................................................... 363/16
(58) Field of Search .............................. 363/15, 16, 20, 363/21.01, 21.04, 21.12, 95, 97, 131; 323/267

(56) References Cited

U.S. PATENT DOCUMENTS

| | | | | |
|---|---|---|---|---|
| 5,519,306 A | * | 5/1996 | Itoh et al. .................... | 323/222 |
| 5,619,404 A | * | 4/1997 | Zak ............................. | 363/21 |
| 5,771,160 A | * | 6/1998 | Seong ......................... | 363/20 |
| 6,118,673 A | * | 9/2000 | Hua ............................. | 363/21 |
| 6,369,525 B1 | * | 4/2002 | Chang et al. ............... | 315/300 |

* cited by examiner

Primary Examiner—Matthew V. Nguyen
(74) Attorney, Agent, or Firm—Ostrolenk, Faber, Gerb & Soffen, LLP

(57) ABSTRACT

The multiple output power adapter includes an AC input receptacle which plugs into an AC power socket. The AC input receptacle is connected to an input of a single output power converter which converts the input AC voltage into an output DC voltage of a specified level. Connected to the output terminal of the single output power converter is a DC-DC module converter which converts the output DC voltage into multiple output DC voltages. Additionally, the multiple output power adapter includes an output wire connected to the output terminal of the single output power adapter in parallel with the DC-DC module converter. The output wire and the output terminal of the DC-DC module converter are both then connected to an electrical component connector. With this structure, DC power can be supplied to an electronic device at a voltage level output by the single output power converter and/or at multiple voltage levels output by the DC-DC module converter.

10 Claims, 3 Drawing Sheets

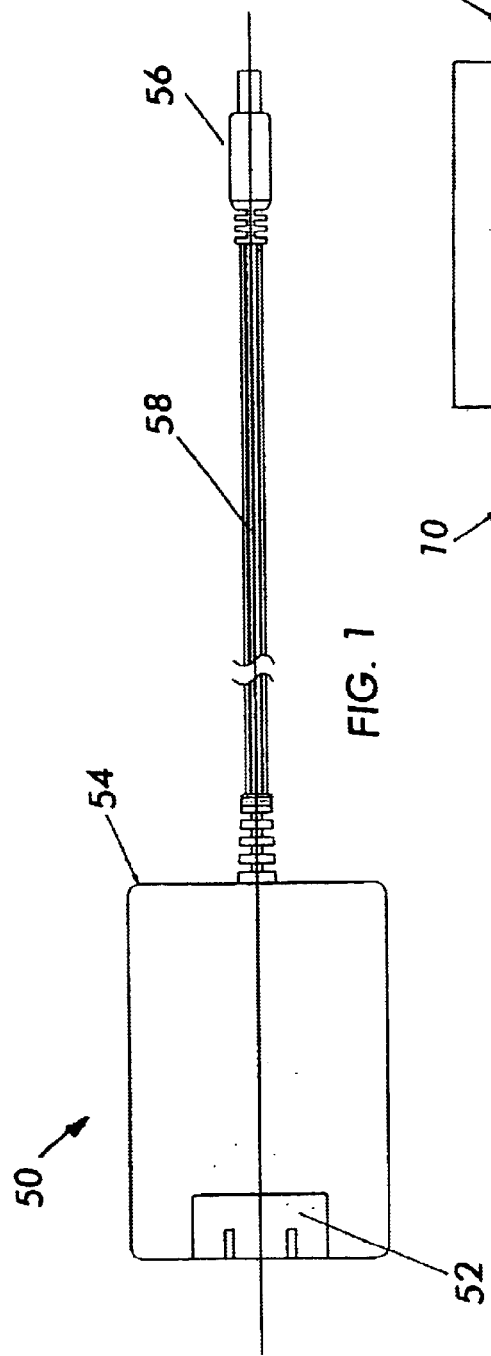
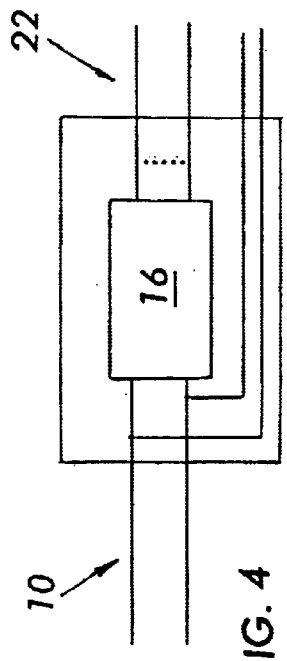
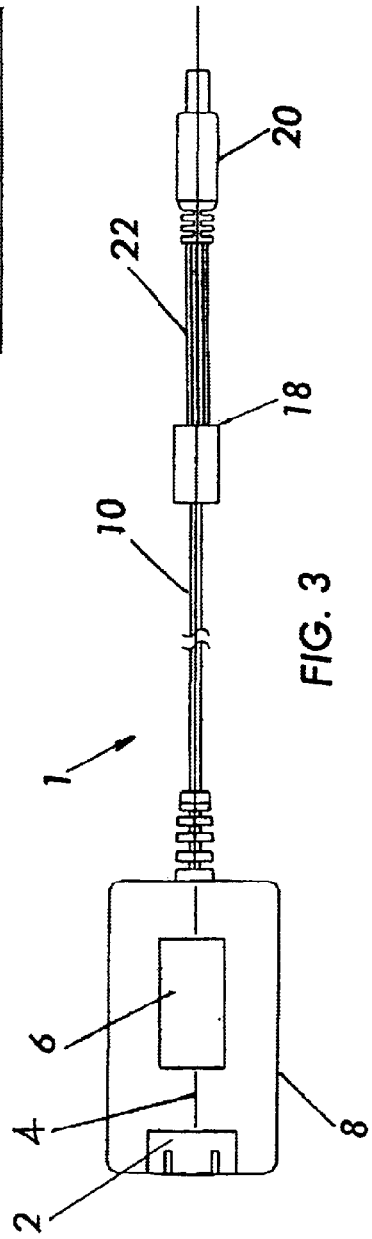
FIG. 1
FIG. 4
FIG. 3

MULTIPLE OUTPUT POWER ADAPTER

BACKGROUND OF THE INVENTION

The present invention relates to AC power adapters, particularly AC power adapters for use with consumer electronics. More particularly, the present invention relates to an AC power adapter with a multiple DC output.

Many different electronic devices are powered by direct-current (DC) voltage, as well as alternating-current (AC) voltage. However, standard line voltage available from wall outlets is AC. Therefore, the AC voltage must be convened to a DC voltage by an AC adapter to be used in these electronic devices.

AC adapters convert AC voltage (for example, 110 volts at 60 Hertz) from a standard wall outlet to a DC voltage (for example, 12 volts) which is useable by an electronic device such as a calculator, portable stereo, video game, and so on.

AC adapters generally include a plug which plugs into a wall outlet, a transformer which steps the line voltage down, a rectifier circuit which rectifies the stepped-down AC voltage to a DC voltage, and a plug which plugs into an electronic device. Numerous types of adapters have been developed, each having a rated voltage for a particular device and each having a plug which has a particular configuration engageable with a compatible socket of that particular device. Accordingly, separate AC adapters are typically provided for each electronic device.

Many times, however, certain electronic devices require more than one DC voltage input for operation of all the components of the device. As a result, AC power adapters which provide multiple DC outputs (i.e., DC outputs at two or more voltage levels) have been developed.

FIG. 1 shows a typical multiple output power adapter 50. The power adapter 50 includes an AC input receptacle 52 which plugs into an AC power socket. The AC input receptacle 52 is connected to an input of a multi-output power converter circuit, such as that shown in FIG. 2. This multi-output power converter circuit converts the input AC voltage into multiple output DC voltages which are output from respective output terminals for each output DC voltage. The multi-output power converter circuit is contained within a housing 54, and the AC input receptacle 52 projects from the housing 54 such that it can be easily connected to a wall socket. The output terminals of the multiple output DC voltages are then connected to respective prongs of an electrical device connector 56 via output wires 58.

Because of this multiple output power adapter design, the housing portion 54 of the adapter 50 which plugs into an AC power socket and contains the multi-output power converter circuit is relatively large. Further, since all of the components are located in the same housing, relatively long output wires 58 are required to be run from the circuitry within the housing 54 to the prongs of the electrical device connector 56. Because relatively long wires 58 are used, this power adapter 50 consumes a relatively large amount of power and has a higher voltage drop from the housing 54 to the device connector 56, thereby decreasing the efficiency of the power adapter 50. Moreover, due to the complex design of the multi-output power converter circuit, the circuit occupies a large volume, has a large power consumption, low efficiency, poor output regulation, and a high manufacturing cost.

Accordingly, there remains a need for a multiple output power adapter which is simple in design, inexpensive to manufacture and is highly efficient.

SUMMARY OF THE INVENTION

The present invention provides a multiple output power adapter which is simple in structure, occupies a smaller volume, can be produced at a lower cost, operates with a higher efficiency and has a better output performance than the prior art power adapters.

The multiple output power adapter of the present invention includes an AC input receptacle which plugs into an AC power socket. The AC input receptacle is connected to an input of a single output power converter circuit which converts the input AC voltage into an output DC voltage of a specified level. The single output power converter circuit is contained within a first housing, and the AC input receptacle projects from the first housing such that it can be easily connected to a wall socket. A first wire is connected to the output of the single output power converter circuit and runs from the first housing to an input of a DC-DC module converter. The DC-DC module converter is contained within a second housing remote from the first housing. The DC-DC module converter converts the output DC voltage into multiple output DC voltages which are output from respective output terminals of the DC-DC module converter. The output terminals for each of the multiple output DC voltages are then connected to respective prongs of an electrical device connector via multiple output wires. Additionally, the single wire connected to the output terminal of the single output power converter circuit is run, in parallel with the DC-DC module converter, to respective prongs of the electrical device connector. With this structure, DC power can be supplied to an electronic device at a level output by the single output power converter circuit via the single wire and/or as a multiple DC voltages output by the DC-DC module converter.

With the above design, a multiple output power adapter is provided which has a relatively simple structure, a high efficiency and improved output performance. Moreover, because the first housing need only contain the single output power converter circuit, the first housing can be designed to occupy a relatively small volume and be produced at a relatively low cost.

BRIEF DESCRIPTION OF THE DRAWINGS

Other features and advantages of the present invention will become apparent from the following description of the invention which refers to the accompanying drawings, wherein:

FIG. 1 is a diagram of a prior art multiple output power adapter;

FIG. 3 is a diagram of the multiple output power adapter according to a preferred embodiment of the present invention;

FIG. 4 is a schematic diagram of a DC-DC multiple output converter according to a preferred embodiment of the present invention;

DETAILED DESCRIPTION OF EMBODIMENTS OF THE INVENTION

Figure 2:
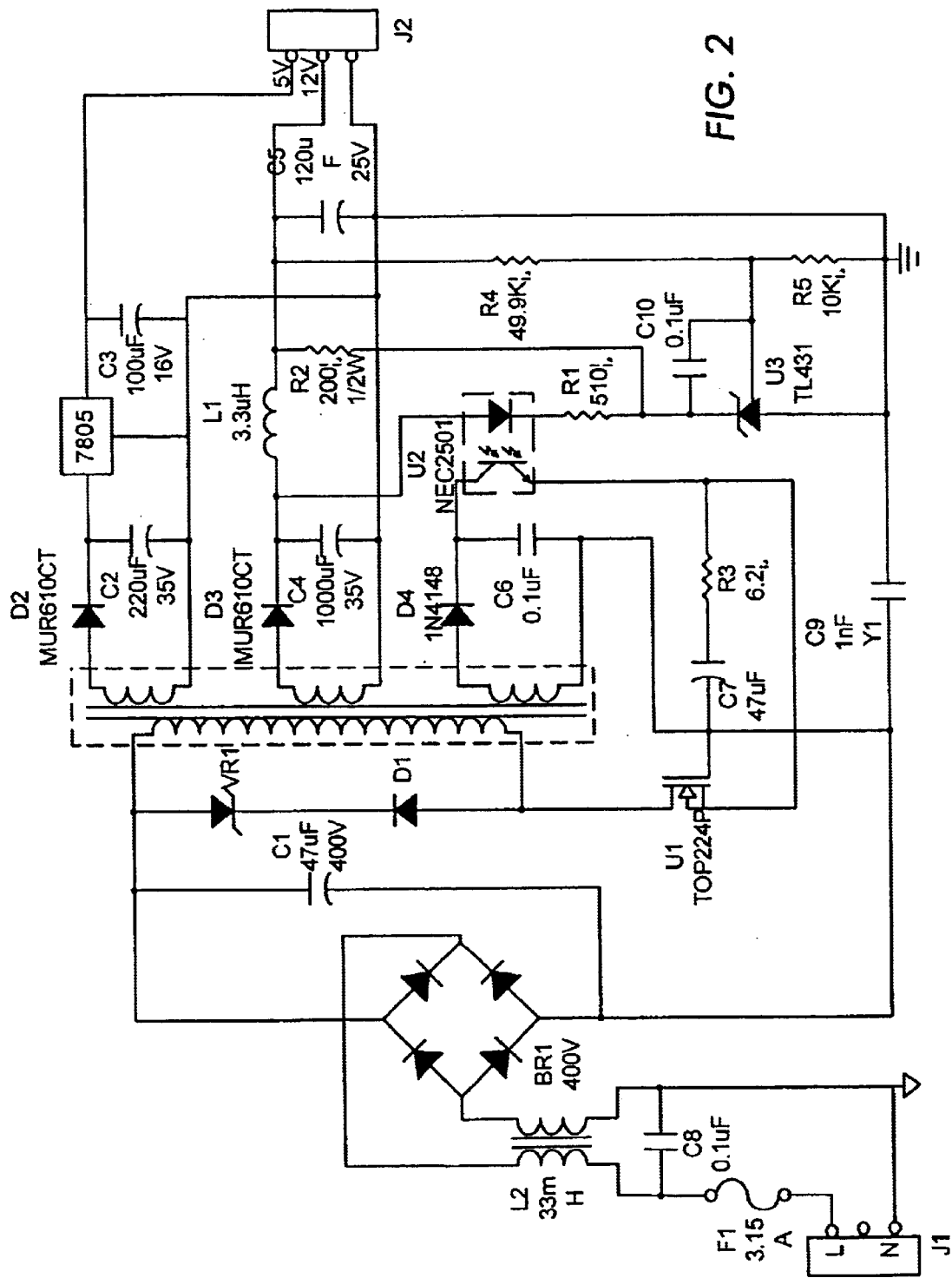
FIG. 2 is a schematic diagram of a prior art multi-output power converter circuit of the power adapter of FIG. 1.

Referring now to the drawings, FIG. 3 shows the multiple output power adapter of the present invention, generally referred to as 1. The multiple output power adapter 1 includes an AC input receptacle 2 which plugs into an AC power socket (not shown).

The AC input receptacle 2 is connected to an input 4 of a single output power converter circuit 6. The single output power converter circuit 6 converts the input AC voltage into an output DC voltage of a specified level. The single output power converter circuit 6 can be a simple rectifier circuit containing a single diode, a half-wave rectifier, a full-wave rectifier, such as for example, a bridge rectifier having four rectifiers in the form of a bridge, with the AC supply connected across one diagonal and the DC output taken from the other diagonal, or the like. The choice of a particular rectifier will be apparent to one of skill in the power adapter art and dependent upon the AC-DC conversion characteristics required of the power adapter.

The single output power converter circuit 6 is contained within a first housing 8, and the AC input receptacle 2 projects from the first housing 8 such that it can be easily connected to a wall socket. A first wire 10 is connected to an output of the single output power converter circuit 6 and runs from the first housing 8 to an input of a DC-DC module converter 16 as shown in FIG. 4. The first wire 10 preferably comprises two wires, each of which are respectively connected to the plus (+) and minus (−) voltage terminal outputs of the single output power converter circuit 6.

Figure 5:
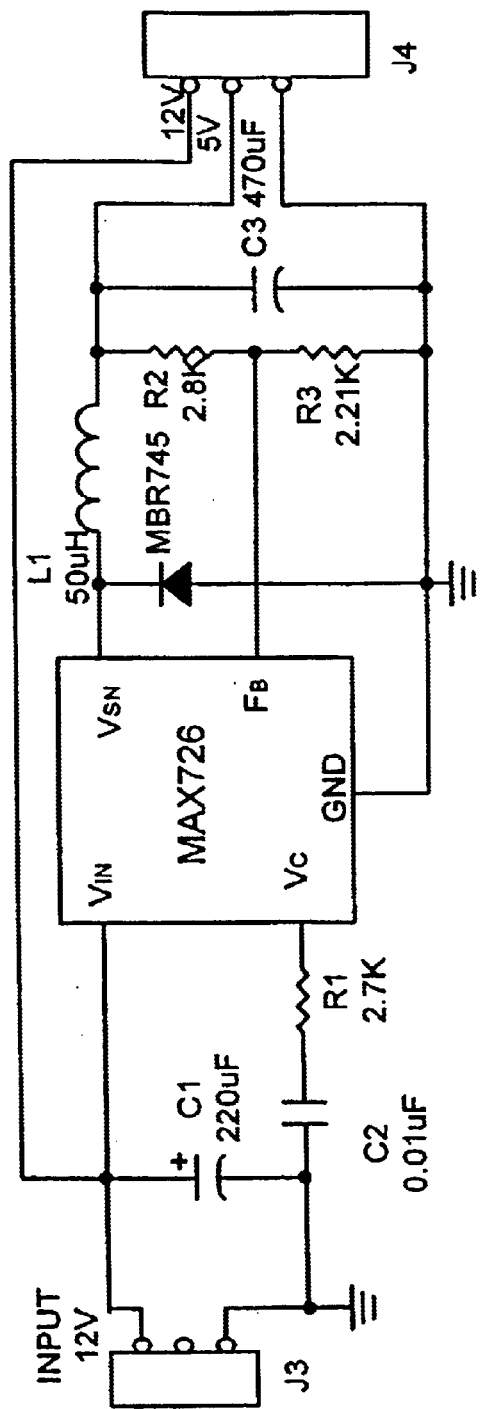
FIG. 5 is a schematic diagram of a circuit of the DC-DC multiple output converter of FIG. 4.

The DC-DC module converter 16 is preferably contained within a second housing 18 remote from the first housing 8. The DC-DC module converter 16 converts the output DC voltage from the single output power converter circuit 6 into multiple output DC voltages. These multiple output DC voltages are output from respective output terminals of the DC-DC module converter 16 as shown in FIG. 4. Preferably, the DC-DC module converter 16 is designed to output two or more separate voltage levels. For example, two voltage levels of 12.0 $V_{DC}$ at 200 mA and 5.0 $V_{DC}$ at 300 mA can be output. A sample circuit which outputs two separate voltage levels of 12 V and 5 V is shown in FIG. 5. Other circuits, such as those which output three voltage levels of, for example, 27.0 $V_{DC}$ at 5 mA, 9.0 $V_{DC}$ at 530 mA and −5.0 $V_{DC}$ at 5 mA, or three voltage levels of 5.0 $V_{DC}$ at 700 mA, 12.0 $V_{DC}$ at 20 mA and −12.0 $V_{DC}$ at 20 mA can also be used as the DC-DC module converter. These listed voltage levels are merely exemplary and it will be evident that the DC-DC module converter can be designed to output any combination of required voltage levels.

Figure 6:
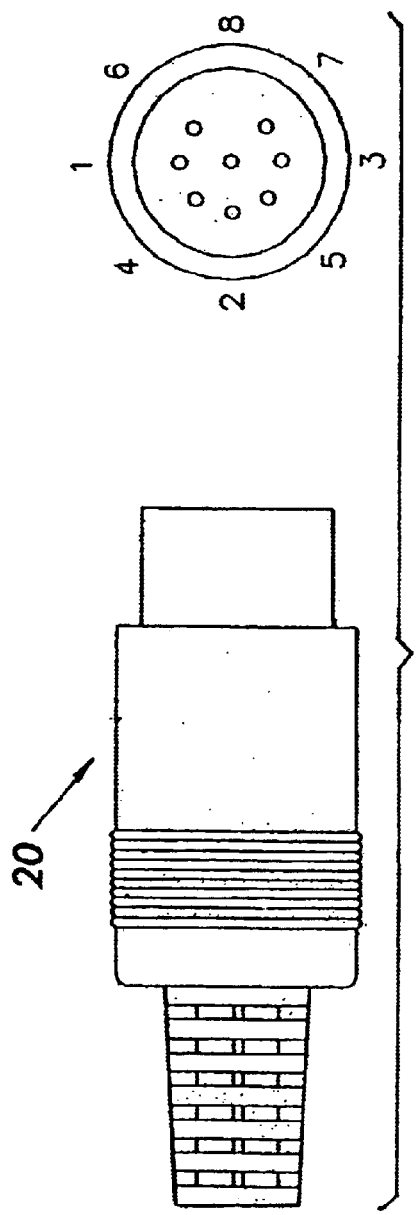
FIG. 6 shows an electronic device connector for the multiple output power adapter of FIG. 3.

The output for each of the multiple output DC voltages are then connected to respective prongs, for example prongs 1 through 8 of FIG. 6, of an electrical device connector 20 via multiple output wires 22. The respective prongs of the electrical device connector 20 can be either male or female connectors, the selection of which will depend upon the particular application of the power adapter. The multiple output wires 22 preferably comprise two wires for each output of the DC-DC module converter 16, each of which are respectively connected to the plus (+) and minus (−) voltage terminal outputs of each respective output of the DC-DC module converter 16. When the electrical device connector 20 is plugged into the electrical device (not shown), the connection of the specific components of the device to the respective prongs of the connector 20 will determine the voltage to be supplied to the specific components. The electrical device connector 20 shown in FIG. 6 is but one example of a connector style which may be used in conjunction with the present invention. Many electrical device connector styles are known, and the choice of any particular style will depend upon the device to which the power adapter is to be used.

Additionally, and as shown in FIG. 4, the first wire 10 connected to the output terminal of the single output power converter circuit 6 is run, in parallel with the DC-DC module converter 16, to respective prongs of the electrical device connector 20. With this structure, DC power is supplied to an electronic device at the voltage output by the single output power converter circuit 6 via the first wire 10 and/or as multiple DC voltages output by the DC-DC module converter 16 via the multiple output wires 22. Preferably, the first wire 10 is branched-off within the second housing 18 and run in a grouping with the multiple output wires 22 to the electrical device connector 20.

Preferably, only the first wire 10 is run from the first housing 8 to the second housing 18, and the grouping of the branched-off first wire 10 and the multiple wires 22 are run from the second housing 18 to the electrical device connector 20. When the wires are configured in this manner, the power adapter of the present invention consumes less power and has a lower voltage drop along the multiple output wires because they are run a shorter distance from the second housing to the electrical device connector, thereby increasing the efficiency of the power adapter. Moreover, due to the simple design of the single output power converter circuit, only a relatively small first housing is needed. All of the above components enable the power adapter of the present invention to be produced at a low manufacturing cost.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A multiple output power adapter comprising:
    a first housing;
    a second housing remote from the first housing;
    an AC input receptacle provided in the first housing;
    a single output power converter circuit enclosed within the first housing and electrically connected to the AC input receptacle, the single output power converter circuit converting input AC power into a single output DC voltage; and
    a DC to DC converter circuit electrically connected to the single output power converter circuit and enclosed within the second housing, the DC to DC converter circuit converting the single output DC voltage into multiple output DC voltages.

2. The multiple output power adapter according to claim 1, further comprising an electrical device connector electrically connected to the single output power converter circuit and the DC to DC converter circuit.

3. The multiple output power adapter according to claim 1, wherein the single output power converter circuit is a rectifier.

4. The multiple output power adapter according to claim 3, wherein the rectifier is a single diode circuit.

5. The multiple output power adapter according to claim 3, wherein the rectifier is a half-wave rectifier.

6. The multiple output power adapter according to claim 3, wherein the rectifier is a full-wave rectifier.

7. The multiple output power adapter according to claim 6, wherein the full-wave rectifier is a bridge rectifier.

8. The multiple output power adapter according to claim 1, wherein the DC to DC converter circuit outputs two or more separate voltage levels.

9. The multiple output power adapter according to claim 2, further comprising:

a first wire connecting the single Output DC voltage of the single output power converter circuit to the electrical device connector; and multiple wires connecting the multiple output DC voltages of the DC to DC converter circuit to the electrical device connector.

10. The multiple output power adapter according to claim 9, wherein the first wire runs from the first housing to the second housing and is branched-off within the second housing and run together with the multiple wires from the second housing to the electrical device connector.

* * * * *